United States Patent
Pye et al.

(10) Patent No.: US 12,459,948 B2
(45) Date of Patent: Nov. 4, 2025

(54) PROCESSES AND INTERMEDIATES FOR PREPARING A Btk INHIBITOR

(71) Applicant: JANSSEN PHARMACEUTICA NV, Beerse (BE)

(72) Inventors: Philip James Pye, Bridgewater, NJ (US); Andras Horvath, Turnhout (BE); Laurent Lefort, Zoersel (BE); Bernardus Kaptein, Sittard (NL); Gerardus Karel Maria Verzijl, Well (NL); Yuanyuan Yuan, Changzhou (CN); Jinxiong Su, Changzhou (CN)

(73) Assignee: Janssen Pharmaceutica NV, Beerse (BE)

( * ) Notice: Subject to any disclaimer, the term of this patent is extended or adjusted under 35 U.S.C. 154(b) by 1000 days.

(21) Appl. No.: 17/612,034

(22) PCT Filed: May 20, 2020

(86) PCT No.: PCT/EP2020/064119
§ 371 (c)(1),
(2) Date: Nov. 17, 2021

(87) PCT Pub. No.: WO2020/234379
PCT Pub. Date: Nov. 26, 2020

(65) Prior Publication Data
US 2022/0235058 A1 Jul. 28, 2022

(30) Foreign Application Priority Data

May 21, 2019 (WO) ................ PCT/CN2019/087804

(51) Int. Cl.
*C07D 211/02* (2006.01)
*C07D 211/56* (2006.01)
*C07D 487/04* (2006.01)

(52) U.S. Cl.
CPC .......... *C07D 487/04* (2013.01); *C07D 211/56* (2013.01)

(58) Field of Classification Search
CPC ........................... C07D 211/02; C07D 211/56
USPC ................................................. 546/185, 244
See application file for complete search history.

(56) References Cited

U.S. PATENT DOCUMENTS

| | | | |
|---|---|---|---|
| 7,514,444 B2 | 4/2009 | Honigberg et al. | |
| 9,156,847 B2 | 10/2015 | Pye et al. | |
| 2008/0076921 A1 | 3/2008 | Honigberg et al. | |
| 2011/0082137 A1 | 4/2011 | Giovannini et al. | |
| 2016/0264584 A1 | 9/2016 | Xu | |
| 2018/0009814 A1 | 1/2018 | Benhaim et al. | |
| 2022/0098200 A1 | 3/2022 | Ben et al. | |

FOREIGN PATENT DOCUMENTS

| | | |
|---|---|---|
| CN | 107233344 A | 10/2017 |
| CN | 107383017 A | 11/2017 |
| CN | 107385966 A | 11/2017 |
| CN | 109180683 A | 1/2019 |
| EA | 020001 B1 | 7/2014 |
| JP | 2016-510779 A | 4/2016 |
| JP | 2018-502077 A | 1/2018 |
| WO | 2008/039218 A2 | 4/2008 |
| WO | 2014/068527 A1 | 5/2014 |
| WO | 2014/139970 A1 | 9/2014 |
| WO | 2016/115356 A1 | 7/2016 |
| WO | 2017/198050 A1 | 11/2017 |
| WO | 2018/006795 A1 | 1/2018 |
| WO | 2018/065504 A1 | 4/2018 |

OTHER PUBLICATIONS

Ansari A. et al, "Enantioselective Synthesis of 2-Aminomethyl and 3-Amino Pyrrolidines and Piperidines through 1,2-Diamination of Aldehydes," Journal of organic chemistry, vol. 83, Issue 15, 2018, pp. 8161-8169.

Horwood N. J. et al., "Bruton's Tyrosine Kinase is Required For Lipopolysaccharide-induced Tumor Necrosis Factor a Production," The Journal of Experimental Medicine, vol. 197, Issue 12, 2003, pp. 1603-1611.

Iwaki et al, "Btk Plays a Crucial Role in the Amplification of Fc?RI-mediated Mast Cell Activation by Kit," Journal of Biological Chemistry, vol. 280, Issue 48, 2005, pp. 40261-40270.

Jefferies C. A. et al, "Bruton's Tyrosine Kinase is a Toll/Interleukin-1 Receptor Domain-binding Protein That Participates in Nuclear Factor ?B Activation by Toll-like Receptor 4," Journal of Biological Chemistry, vol. 278, Issue 28, 2003, pp. 26258-26264.

Kurosaki, "Functional dissection of BCR signaling pathways," Current Opinion in Immunology, vol. 12, Issue 3, Jun. 1, 2000, pp. 276-281.

(Continued)

*Primary Examiner* — Charanjit Aulakh

(74) *Attorney, Agent, or Firm* — BakerHostetler

(57) ABSTRACT

Disclosed is a process for the preparation of certain intermediates, e.g. process for preparing a compound of formula (I) or a pharmaceutically acceptable salt thereof, in an enantioenriched form, which intermediate and processes are useful in the preparation of a BTK inhibitor, such as ibrutinib.

(I)

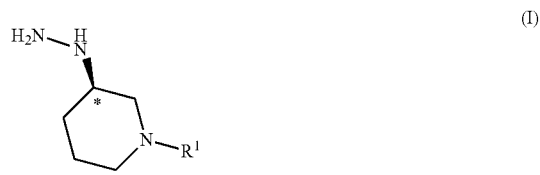

9 Claims, No Drawings

(56) References Cited

OTHER PUBLICATIONS

Quek et al, "A role for Bruton's tyrosine kinase (Btk) in platelet activation by collagen," Current Biology, vol. 8, Issue 20, 1998, pp. 1137-1140.
Schaeffer E.M. et al, "Tec family kinases in lymphocyte signaling and function," Current Opinion in Immunology, vol. 12, Issue 3, Jun. 1, 2000, pp. 282-288.
Vassilev et al, "Bruton's Tyrosine Kinase as an Inhibitor of the Fas/CD95 Death-inducing Signaling Complex," Journal of Biological Chemistry, vol. 274, Issue 3, 1999, pp. 1646-1656.
Berge et al., Pharmaceutical Salts, Journal of Pharmaceutical Sciences, vol. 66, No. 1, pp. 1-19, Tables I and II, Jan. 1977.
Kümmerer, "Pharmaceuticals in the Environment", Annual Review of Environment and Resources, 2010, vol. 35, pp. 57-75.
Smit et al., Organic Synthesis: The Science Behind the Art, Translation from English, Moscow: Mir, 2001, pp. 64 and 159.

PROCESSES AND INTERMEDIATES FOR PREPARING A Btk INHIBITOR

CROSS-REFERENCE TO RELATED APPLICATIONS

This application is the National Stage of International Patent Application No. PCT/EP2020/064119, filed May 20, 2020, which claims the benefit of International Patent Application No. PCT/CN2019/087804, filed May 21, 2019, the disclosures of which are incorporated herein by reference in their entireties.

FIELD OF THE INVENTION

The present invention relates to synthesis procedures and synthesis intermediates of substituted bicyclic compounds, especially compounds that are useful as medicaments, for instance Bruton's tyrosine kinase (Btk) inhibitors such as ibrutinib.

BACKGROUND OF THE INVENTION

Ibrutinib is an organic small molecule having IUPAC name 1-[(3R)-3-[4-amino-3-(4-phenoxyphenyl)pyrazolo[3,4-d]pyrimidin-1-yl]piperidin-1-yl]prop-2-en-1-one. It is described in a number of published documents, including international patent application WO 2008/039218 (Example 1b), and is described as an irreversible inhibitor of Btk.

Btk plays an essential role in the B-cell signaling pathway linking cell surface B-cell receptor stimulation to downstream intracellular responses. Btk is a key regulator of B-call development, activation, signaling, and survival (Kurosaki, *Curr Op Imm,* 2000, 276-281; Schaeffer and Schwartzberg, *Curr Op Imm* 2000, 282-288). In addition, Btk plays a role in a number of other hematopoetic cell signaling pathways, e.g. Toll like receptor (TLR) and cytokine receptor-mediated TNF-α production in macrophages, IgE receptor (FcepsilonRI) signaling in Mast cells, inhibition of Fas/APO-1 apoptotic signaling in B-lineage lymphoid cells, and collagen-stimulated platelet aggregation. See e.g., C. A. Jeffries, et al., (2003), *Journal of Biological Chemistry* 278:26258-26264; N. J. Horwood, et al., (2003), *The Journal of Experimental Medicine* 197:1603-1611; Iwaki et al. (2005), *Journal of Biological Chemistry* 280 (48):40261-40270; Vassilev et al. (1999), *Journal of Biological Chemistry* 274(3):1646-1656, and Quek et al (1998), *Current Biology* 8(20):1137-1140.

Ibrutinib has been approved for certain hematological malignancies in several countries including the US and the EU, and is also being studied in clinical trials for other hematological malignancies. Such malignancies include chronic lymphocytic leukemia, mantle cell lymphoma, diffuse large B-cell lymphoma and multiple myeloma.

There are a number of ways of preparing functionalised bicyclic heterocycles and ibrutinib, which have been described in inter alia US patent document US 2011/0082137 and international patent application WO 2008/039218 (Example 1b). In relation to the latter, the latter steps for synthesising ibrutinib are shown in the following scheme:

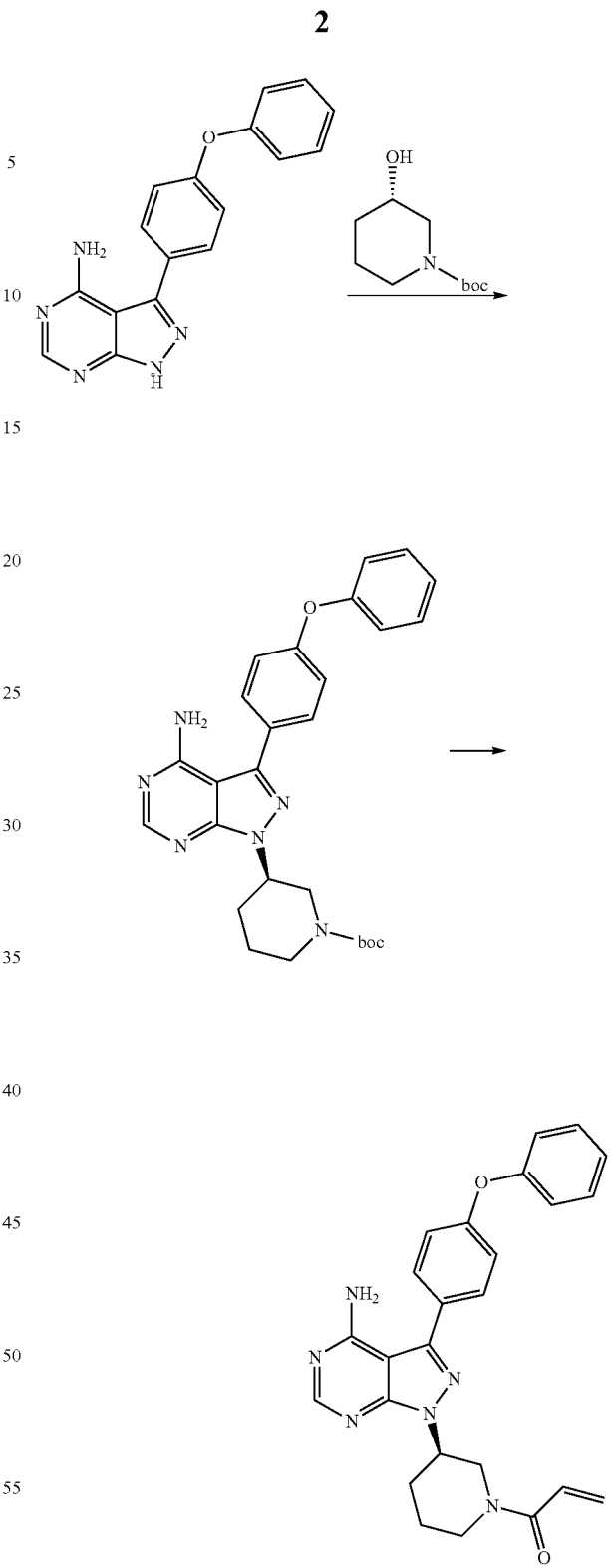

The above synthesis has also led to several synthesis strategies for preparing the chiral hydroxypiperidine intermediate, including in unpublished PCT application PCT/EP2017/075289.

Other methods for synthesising ibrutinib have been disclosed in international patent application WO 2014/139970, including through the following scheme:

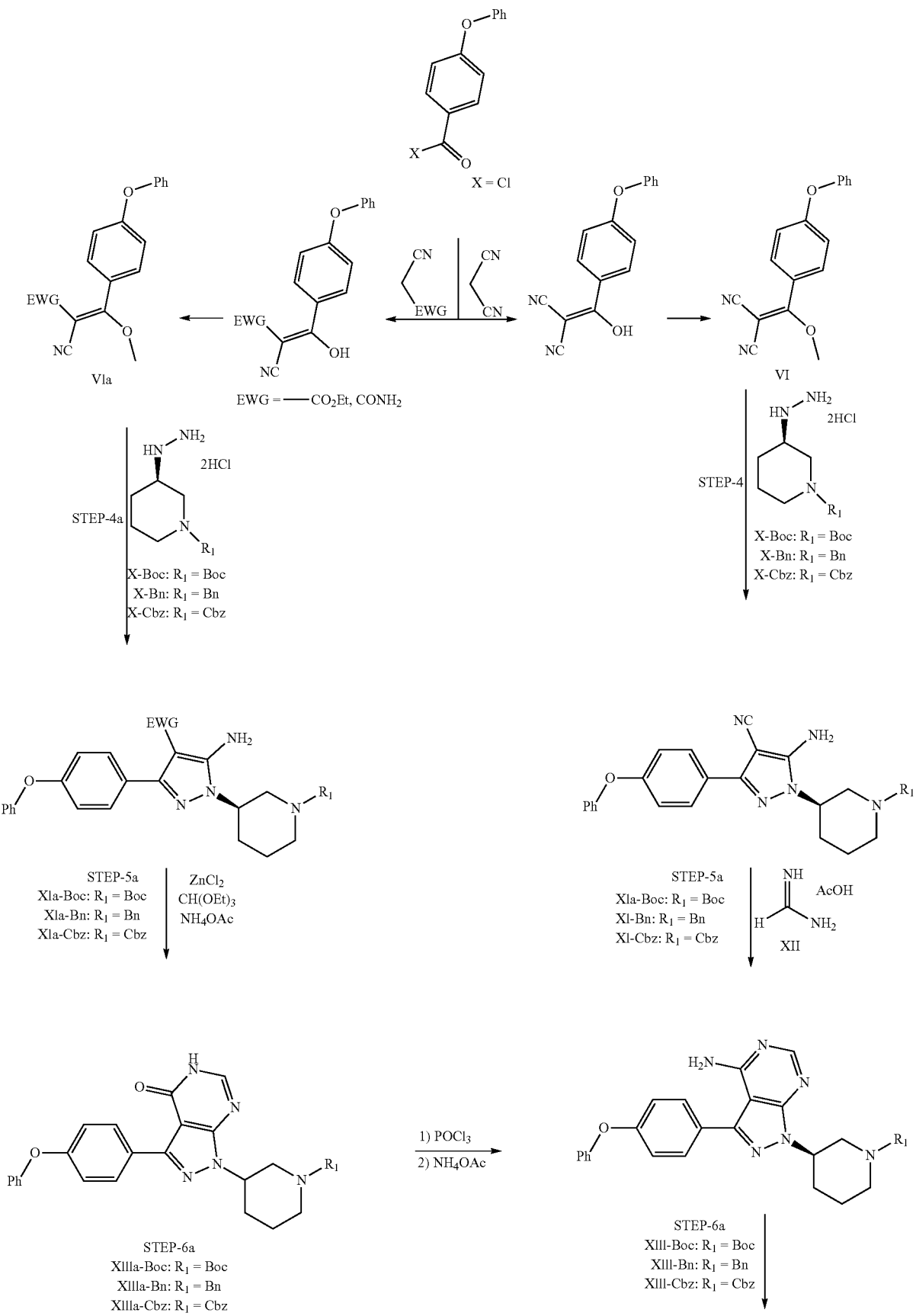

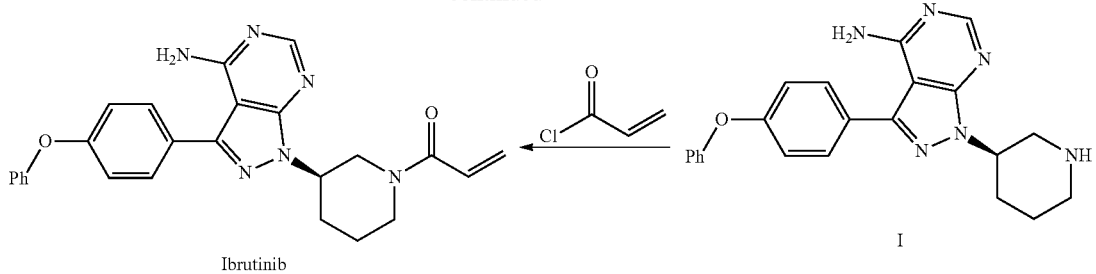

Ibrutinib

I

The final step to introduce the substituent on the nitrogen atom of the piperidinyl ring may also be performed in accordance with procedures described in international patent application WO 2016/115356, by reaction with 3-chloropropionyl chloride (for instance in the presence of aqueous $NaHCO_3$ in Me-THF), thereby introducing a —C(O)—$CH_2CH_2$—Cl group at the nitrogen atom of the piperidinyl. Such intermediate then undergoes an elimination reaction in the presence of DBU (1,8-diazabicyclo(5.4.0)undec-7-ene) to provide ibrutinib.

The synthesis described above makes use of a non-symmetrical chiral hydrazine, which is a key element of the synthetic route. Such chiral hydrazine is prepared by resolution, and mentioned therein is chiral chromatography, e.g. chiral SFC. Such processes may be cumbersome and/or inefficient. It is an object of the invention to find alternative/improved processes to such chiral hydrazines, which may be useful as a building block in the further synthesis of functionalised heterocycles, for example ibrutinib.

DESCRIPTION OF THE INVENTION

There is now provided a process for preparing a compound of formula (I)

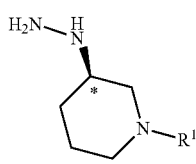

(I)

or a pharmaceutically acceptable salt thereof, in an enantioenriched form,
wherein
$R^1$ represents hydrogen or a nitrogen protecting group;
* represents a chiral centre of an (R) configuration;
which process comprises reductive hydrazination of a compound of formula (II)

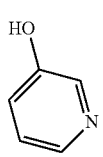

(II)

i.e. 3-hydroxypyridine, or a salt thereof, with a compound of formula (III)

$H_2N$—$N(H)$—$R^2$ (III)

or a salt thereof, wherein $R^2$ represents hydrogen or a nitrogen protecting group, so forming a compound of formula (IV),

or a salt thereof, wherein $R^2$ is as defined above, followed by, in any order, optional deprotection at $R^2$ (when $R^2$ represents a nitrogen protecting group), optional introduction of $R^1$ at the NH moiety of the piperidinyl ring (when $R^1$ represents a nitrogen protecting group), and then (if needed) resolution, which process may be referred to herein as a process of the invention (which consists of one or more embodiments).

The process of the invention produces an enantioenriched compound of formula (I) and may alternatively be described as a process for preparing a composition comprising compound of formula (I) in which the (R)-enantiomer is the predominantly formed enantiomer, thus providing an ee of greater than 20% (and in embodiments described herein in an ee greater still).

Herein, it is indicated in the process of the invention (and embodiments described herein) that a salt of the compound may be employed and/or produced. Alternatively (and in a preferred embodiment), the free base of the compound may be employed and/or produced. Further, if a salt form is employed and/or produced, it may be liberated to form the free base form (e.g. for further reaction, for instance for use in the further process steps such as those described herein). It should also be noted that compounds mentioned herein may exhibit isomerism, e.g. tautomerism.

As indicated above, the compound of formula (II) may be in the form of a salt, and hence it could be a compound that results in the formation of a quaternary salt (e.g. a benzyl group may be present on the nitrogen of the pyridyl moiety, thereby forming a benzyl quaternary salt).

As advantage of the process of the invention is that the compound of formula (II) is reduced in a single step, which includes reduction of what is effectively a keto group (a tautomer of the enol moiety depicted) to a hydrazone, and then to the hydrazine). This has the advantage that intermediates (e.g. that may be unstable) need not be separated and/or isolated.

After the reductive hydrazination of the process of the invention to produce a compound of formula (IV) and pursuant to optional deprotection/removal of R² (when it is a nitrogen protecting group) and introduction of R¹ (when it is a nitrogen protecting group), for the avoidance of doubt the following compound of formula (V) is obtained (and in an embodiment, R¹ represents a nitrogen protecting group) via a compound of formula (VA) (in which R¹ and R² independently represent nitrogen protecting groups),

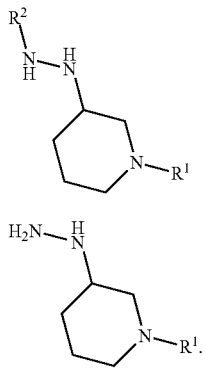

In an embodiment of the invention, there is also provided a process for preparing a compound of formula (I) comprising a resolution of a compound of formula (V) (for instance under conditions described herein). In such an embodiment, the compound of formula (V) need not be prepared as hereinbefore described in the process of the invention, but in a further embodiment, the compound of formula (V) is prepared as described hereinbefore (i.e. by the reductive hydrazination of the compound of formula (II) with the compound of formula (III) followed by optional deprotection/removal of R² (when it is a nitrogen protecting group) and introduction of R¹ (when it is a nitrogen protecting group). The preferred compound of formula (V) that is employed in the resolution to provide the desired compound of formula (I) is that in which R¹ represents a nitrogen protecting group (for instance as described herein).

In the process of the invention, an advantage of using a compound of formula (II) that is a quaternary salt, for instance a quaternary salt that has a nitrogen-protecting group such as benzyl on the nitrogen atom, is that if it is desired to prepare a compound of formula (VA) (and/or a compound of formula (V)) in which R¹ represents such a protecting group (e.g. benzyl), then such group need not be introduced after the reductive hydrazination of the process of the invention.

All individual features (e.g. preferred features) mentioned herein may be taken in isolation or in combination with any other feature (including preferred feature) mentioned herein (hence, preferred features may be taken in conjunction with other preferred features, or independently of them).

The skilled person will appreciate that compounds mentioned in the context of the process of the invention are those that are stable. That is, compounds included herein are those that are sufficiently robust to survive isolation from e.g. a reaction mixture to a useful degree of purity.

For the avoidance of doubt, the compound of formula (V) is racemic (or of low enantiopurity, e.g. displaying an enantiomeric excess "ee" of less than 20%) i.e. the chiral centre at the point of attachment of the —N(H)NH₂ group contains an equimolar mixture of (R)- and (S)-configurations (or a substantially lower preference for one configuration compared to the other, e.g. less than 60% of the dominant enantiomer). Whereas the corresponding chiral centre of the compound of formula (I) is mainly of the (R)-configuration (and is described as being an "enantioenriched product").

As indicated above, the process of the invention includes a "reductive hydrazination", by which we mean a reduction (of the aromatic ring of the pyridine of formula (II)) together with the introduction of a hydrazine group (or a protected version thereof, as per the definition of the compound of formula (III) and the definition of R²).

In the process of the invention, in an embodiment, the compound of formula (III) is one in which R² is a nitrogen protecting group. For instance, the nitrogen protecting group is a group that results in the formation of:
  an amide (e.g. N-acetyl)
  optionally substituted N-alkyl (e.g. N-allyl or optionally substituted N-benzyl)
  N-sulfonyl (e.g. optionally substituted N-benzenesulfonyl)
  a carbamate
  a urea
  trityl (triphenylmethyl), diphenylmethyl, or the like Hence, R² may, amongst other groups, represent:
—C(O)R^{r1} (in which R^{r1} preferably represents $C_{1-6}$ alkyl or optionally substituted aryl); $C_{1-6}$ alkyl, which alkyl group is optionally substituted by one or more substituents selected from optionally substituted aryl (e.g. preferably forming a benzyl moiety); —S(O)₂R^{r2} (in which R^{r2} preferably represents optionally substituted aryl); or, preferably, —C(O)OR^{r3} (in which R^{r3} preferably represents optionally substituted aryl or, more preferably, optionally substituted $C_{1-6}$ (e.g. $C_{1-4}$) alkyl, e.g. tert-butyl (so forming, for example, a tert-butoxycarbonyl protecting group, i.e. when taken together with the amino moiety, a tert-butylcarbamate group) or a —CH₂phenyl group (so forming a carboxybenzyl protecting group);
—C(O)N(R^{r4})R^{r5} (in which, preferably, R^{r4} and R^{r5} independently represent hydrogen, $C_{1-6}$ alkyl, optionally substituted aryl or —C(O)R^{r6}, and R^{r6} represents $C_{1-6}$ alkyl or optionally substituted aryl).

In an embodiment, the most preferred R² group is tert-butoxycarbonyl (i.e. —C(O)—O-tert-butyl or t-BOC), i.e. such that the compound of formula (III) represents H₂N—N(H)—C(O)—O-tert-butyl. It is particularly advantageous given that hydrazine (or a suitable form thereof) may be difficult to handle, and further it may be advantageous to produce a compound of formula (IV) in which R² represents a nitrogen protecting group (e.g. t-Boc) so that subsequent steps, for example protection of the nitrogen of the piperidinyl ring i.e. introduction of an R¹ protecting group, and/or deprotection of the hydrazine protecting group i.e. removal of the R² protecting group (to form a compound of formula (V) in which R¹ represents a nitrogen protecting group), may occur in manageable process steps, for instance so that the compound of formula (V) may be resolved in accordance with the processes described herein. Compounds of formula (VA) or (V) in which R¹ is a certain leaving group (especially when it is benzyl) may give improved or better ee in the resolution step (in particular, this applies to compounds of formula (V), given that in an embodiment, compound of formula (VA) is deprotected to give a compound of formula (V) before the resolution step). In addition to such compounds in which R¹ being a certain protecting group leading to advantages or improvements regarding ee in the resolution step, such protecting group may also have other advantages e.g. in terms of ease of protection/deprotection, being the most efficient during other reaction steps (e.g. reduction in the main process of the invention).

In further embodiments of the invention, there is provided certain compounds per se, for example: a compound of formula (IV), a compound of formula (VA) and/or a compound of formula (V).

The process of the invention involves a reductive hydrazination, that is conversion of compound of formula (II) to a compound of formula (IV) in the presence of a hydrazine compound of formula (III). It will be understood that such a "reductive" step will necessarily be conducted in the presence of a hydrogen source. For example, it may be performed in the presence of a suitable catalyst, for instance a metal catalyst such as palladium, nickel, platinum, ruthenium, rhodium and/or iridium (in an embodiment palladium is employed, for example palladium on carbon i.e. Pd/C, which may be between 5-10% Pd/C). There may be any suitable hydrogen source for the reduction (or reductive hydrazination), for instance $H_2$ gas (which may be introduced under pressure at e.g. about 20 bar; generally the $H_2$ gas will be stored in a pressurised cylinder and the process uses greater than 1 atmosphere of $H_2$). Another suitable hydrogen source (which may be used in addition to the $H_2$ gas or as an alternative) may also be used, for example a suitable donor molecule such as a protonic acid, e.g. acetic acid, formic acid or the like (for instance sodium formate in water). This aspect of the process of the invention may also be performed in the presence of a suitable solvent, for instance any suitable solvent such as, in an embodiment of the invention an alcoholic solvent (e.g. methanol). In an embodiment, the vessel or autoclave in which the reduction (or reductive hydrazination) is performed is heated for instance to a temperature above room temperature (e.g. above 40° C., for instance above 55° C. such as between 55-70° C., but the maximum temperature will depend on the boiling point of any solvent employed; for instance if the reaction is performed in the presence of methanol, then the temperature is about 62° C.). The reaction may run for a number of hours to completion, for instance overnight (e.g. about 12 hours), however, the reaction may be monitored for its progress/completion and the duration adjusted accordingly. If the catalyst used in this reaction contains water, then if desired that may be partially removed by stirring in the solvent employed in this process step (e.g. alcoholic solvent, methanol). After the reaction has progressed, the reaction mixture may be worked up and the desired product (compound of formula (IV)) extracted, separated and/or isolated.

It is then indicated that the compound of formula (IV) is transformed by (i) optional deprotection at $R^2$ (when $R^2$ represents a nitrogen protecting group) and (ii) optional introduction of $R^1$ at the NH moiety of the piperidinyl ring (when $R^1$ represents a nitrogen protecting group). In an embodiment, it is preferred that the compound of formula (III) is one in which $R^2$ represents a nitrogen protecting group (in an embodiment, it represents a BOC-protecting group), and hence the compound of formula (IV) so formed is also one in which $R^2$ represents such a protecting group. In an embodiment, it is also preferred that the compound of formula (I) is one in which $R^1$ represents a nitrogen protecting group and hence, in an embodiment, to the compound of formula (IV) that is produced by the reductive hydrazination, step (ii) is preferably performed first, i.e. introduction of an $R^1$ protecting group, so forming a compound of formula (VA) (or a compound of formula (V)).

When the compounds of formulae (VA) and (V) are produced, it is particularly preferred that $R^1$ represents a nitrogen protecting group (especially for the compound of formula (V) to be resolved. In this respect, $R^1$ may represent is a group that results in the formation of:

an amide (e.g. N-acetyl)
optionally substituted N-alkyl (e.g. N-allyl or optionally substituted N-benzyl)
N-sulfonyl (e.g. optionally substituted N-benzenesulfonyl)
a carbamate
a urea
trityl (triphenylmethyl), diphenylmethyl, or the like Hence, $R^1$ may, amongst other groups, represent:
—$C(O)R^{r1}$ (in which $R^{r1}$ preferably represents $C_{1-6}$ alkyl or optionally substituted aryl); $C_{1-6}$ alkyl, which alkyl group is optionally substituted by one or more substituents selected from optionally substituted aryl (e.g. preferably forming a benzyl moiety);
—$S(O)_2R^{r2}$ (in which $R^{r2}$ preferably represents optionally substituted aryl); or, preferably, —$C(O)OR^{r3}$ (in which $R^{r3}$ preferably represents optionally substituted aryl or, more preferably, optionally substituted $C_{1-6}$ (e.g. $C_{1-4}$) alkyl, e.g. tert-butyl (so forming, for example, a tert-butoxycarbonyl protecting group, i.e. when taken together with the amino moiety, a tert-butylcarbamate group) or a —$CH_2$phenyl group (so forming a carboxybenzyl protecting group);
—$C(O)N(R^{r4})R^{r5}$ (in which, preferably, $R^{r4}$ and $R^{r5}$s independently represent hydrogen, $C_{1-6}$ alkyl, optionally substituted aryl or —$C(O)R^{r6}$, and $R^{r6}$ represents $C_{1-6}$ alkyl or optionally substituted aryl).

In an embodiment, the most preferred $R^1$ group is $C_{1-6}$ alkyl (e.g. —$CH_3$) substituted by aryl (e.g. by one phenyl ring), so forming for example a benzyl group.

The conversion of the compound of formula (IV) (e.g. in which $R^2$ represents a protecting group such as one hereinbefore defined) to the compound of formula (VA) in which $R^1$ represents a nitrogen protecting group may occur under suitable conditions, for instance when $R^1$ represents $C_{1-6}$ alkyl substituted by aryl (e.g. a benzyl group), then the compound of formula (IV) may be reacted with a compound of formula $R^x$-$L^x$, where $L^x$ represents a suitable leaving group (such as bromo, chloro, iodo, a sulfonate (mesylate, tosylate, triflate), or the like) and $R^x$ represents $C_{1-6}$ alkyl substituted by aryl (e.g. benzyl); hence for the introduction of a benzyl group, the reaction may be performed in the presence of benzyl bromide optionally in the presence of a suitable solvent (e.g. dichloromethane) and suitable base (e.g. organic base, such as an amine base e.g. triethylamine or the like).

In the compound of formula (VA) so produced, the nitrogen protecting group of $R^1$ is, in an embodiment, different to the $R^2$ nitrogen protecting group. By different, we mean that one is able to remove any one (e.g. $R^2$ nitrogen protecting group) under certain conditions while the other (e.g. the $R^1$ nitrogen protecting group) remains substantially intact. Hence, as indicated above (when $R^2$ represents a nitrogen protecting group), in an embodiment, such an $R^2$ protecting group is removed (while the $R^1$ protecting group, e.g. that has just been introduced, remains intact) and that is the compound of formula (VA) is converted to a compound of formula (V). Such a conversion is illustrative of why the $R^1$ and $R^2$ protecting groups are different and susceptible to be cleaved under different conditions. For instance when $R^1$ represents $C_{1-6}$ alkyl substituted by aryl (e.g. one phenyl ring; so forming for example a benzyl group), the $R^2$ protecting group is preferably one that may be removed/cleaved under conditions that does not cause the $R^1$ protecting group to be removed. For example, when $R^2$ represents a BOC-protecting group, suitable conditions may be employed to remove that group while keeping the R¹ protecting group (e.g. when it is benzyl) intact. Such conditions that may be employed include acidic conditions e.g. in the presence of water and HCl, where the temperature may also be controlled so that it does not exceed room temperature (e.g. about 25° C.), for instance by use of a water bath. The reaction may be allowed to progress for a number of hours (e.g. overnight, about 12 hours) at about room temperature (e.g. around 20-25° C.) although one may monitor the progression of the reaction and adjust the time accordingly. After the reaction is progressed/complete, it may be worked up, for instance by cooling in an ice bath and adding an alkaline solution (e.g. NaOH solution, which may be at 32 m %) to neutralise any remaining acid, and the desired product (compound of formula (V)) may be extracted, separated and/or isolated.

In an embodiment, the compound of formula (V) in which R¹ represents benzyl is the compound employed for the resolution step to provide a compound of formula (I).

In the embodiment of the process of the invention in which the compound of formula (V) is resolved to provide a compound of formula (I) (either preceded by the process to prepare the compound of formula (V) as hereinbefore described, i.e. by the reductive hydrazination, or otherwise), then certain resolution processes are preferred. For instance, in an embodiment of the invention, the resolution is performed in the presence of D-(-) tartaric acid to produce the D-(-)-tartaric acid salt of the (R)-enantiomer as defined herein, i.e. an ee of greater than 20% (and in embodiments described herein in an ee greater still). For instance, the enantioenriched products (e.g. the compound of formula (I)) may be produced in an enantiomeric excess of greater than 40%, such as more than 60% and, in an embodiment, greater than 80% enantiomeric excess. The enantioenriched products may even be greater than 90% (for example, they may consist essentially of a single enantiomer, by which we mean that the ee may be 95% or higher, e.g. above 98% or about 100%). Such enantioenrichment (or ees) may be obtained directly, or through further purification techniques that are known to those skilled in the art. For instance, the process of this embodiment of the invention may produce a compound of formula (I) in which R¹ represents a nitrogen protecting group (e.g. benzyl), wherein such a product is enantioenriched.

In this respect, and in a further embodiment, there is provided a compound of formula (IA),

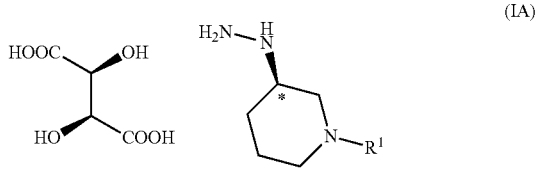

(IA)

which is a compound of formula (I) specifically in the form of a D-(-)-tartaric acid salt, and wherein R¹ is as defined herein (e.g. represents a nitrogen protecting group, such as benzyl). Such a product is enantioenriched as hereinbefore described (e.g. in the context of the compound of formula (I)), for instance an enantiomeric excess of greater than 40%, 60%, 80% or greater than 90% (for example, the ee may be 95% or higher, e.g. above 98% or about 100%).

In an embodiment, the compound of formula (I) (e.g. compound of formula (IA) in which R¹ is a nitrogen-protecting group (e.g. $C_{1-6}$ alkyl substituted by aryl, e.g. benzyl) is the one that may be employed in the downstream steps to provide (ultimately) ibrutinib. For instance, it is such a compound of formula (I) or (IA) that may be employed in reaction with a compound of formula (VI) (see below) to product a compound of formula (VII) in which R¹ represents such a protecting group.

The resolution step described herein may be performed in a number of embodiments, for instance by crystallisation using a chiral salt, and specifically using a D-(-)-tartaric acid salt as described herein. Such as salt (e.g. the D-(-)-tartaric acid salt of formula (IA)) may be prepared by mixing D-(-)-tartaric acid salt with the non-salt form of the compound of formula (I) in the presence of a suitable solvent system. For instance, the solvent system may comprise an alcohol (e.g. methanol or ethanol and aqueous alcohols, such as aqueous methanol or ethanol), for instance a ratio of between 1:1 and 20:1 alcohol:water (where the alcohol is preferably methanol), and in an embodiment, the ratio is between 2:1 and 8:1 e.g. about 4:1. Of interest are solvent systems that are mainly alcohol (e.g. methanol) and alcohol/water mixtures with a minor amount of water, e.g. a water content in the range of about 2% to about 20%, or about 5% to about 10% (w/w). In particular, use can be made of a mixture of water/methanol with a water content in the range of about 5% to about 10%, e.g. about 5% (w/w). The crystallisation is performed at a certain temperature, for instance, in an embodiment of the invention, it may be performed at a temperature between about 0° C. and 80° C., for instance between about room temperature and 65° C. (e.g. between about 40 and 60° C., and in an embodiment about 50° C.). The crystallisation may involve stirring at an elevated temperature (such as those temperatures mentioned hereinbefore, e.g. 50° C.) for a period of time (e.g. between 30 mins and 2 hours; which may initiate crystallisation), followed by cooling for a further period of time (e.g. between 30 mins and 8 hours, such as about 4 hours) back to room temperature. Recrystallisation may also be performed in order to enhance the ee, for instance, it may be performed in the presence of the solvent systems mentioned hereinbefore, for instance at reflux, followed by cooling (and optional seeding).

The resolution using tartaric acid (e.g. D-(-)-tartaric acid) may be advantageous for a number of reasons, for instance it provides a compound of formula (IA) as defined herein in a sufficient ee, and in an embodiment it provides such a compound in a higher ee (e.g. compared to other enantiomeric salts and/or other resolution methods) and/or it provides such a compound whose enantiomeric excess may be further improved e.g. through recrystallisation. Alternatively, or in addition, the compound of formula (IA) may be provided in a sufficiently high purity (e.g. compared to other methods) and/or in a form whose purity may be further enhanced (e.g. by recrystallisation). Hence, in a further embodiment, there may be provided a further recrystallisation step (that proceeds the process to prepare a compound of formula (I) (or a compound of formula (IA)) as hereinbefore described.

As indicated herein the resolution may take place in a suitable solvent system (e.g. methanol/water), and equally the product/salt of compound of formula (I) so formed may also undergo a recrystallisation in a suitable solvent system, for instance in the same solvent system employed for the first crystallisation. However, in an embodiment, the salt form of the compound of formula (I) (e.g. the compound of formula (IA)) need not undergo a further recrystallisation, as it may be the case that the first product is of sufficient ee and/or purity (e.g. for use in further process steps).

A salt form of the compound of formula (I) (e.g. compound of formula (IA)) may be employed directly in further process steps as described herein. Alternatively, if a salt form of a compound of formula (I) is first produced, then the non-salt form may also be liberated before further reaction as described herein.

Unless otherwise specified, alkyl groups as defined herein may be straight-chain or, when there is a sufficient number (i.e. a minimum of three) of carbon atoms be branched-chain, and/or cyclic. Further, when there is a sufficient number (i.e. a minimum of four) of carbon atoms, such alkyl groups may also be part cyclic/acyclic. Such alkyl groups may also be saturated or, when there is a sufficient number (i.e. a minimum of two) of carbon atoms, be unsaturated (including therefore e.g. "vinyl" moieties).

In a further embodiment of the invention, there is provided a use of the compound of formula (I) (in particular, compound of formula (IA)), for instance as prepared in accordance with the process of the invention described herein including all its embodiments, in the preparation of ibrutinib. For instance the compound of formula (I) as prepared in accordance with the processes described herein may be preceded by and proceeded by process steps that are already known (e.g. disclosed in international patent applications WO 2014/139970 and WO 2016/115356) in order to provide ibrutinib. In this respect, there is provided a process for preparing ibrutinib, which process comprises a process for the preparation of a compound of formula (I) as described herein, followed by conversion to ibrutinib—such further step may comprise the following:

(a) reaction of a compound of formula (I) (in particular a compound of formula (IA)), with a compound of formula (VI),

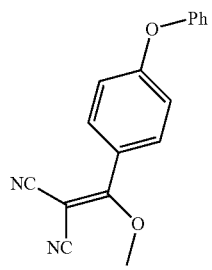

(VI)

or a derivative thereof, so forming a compound of formula (VII),

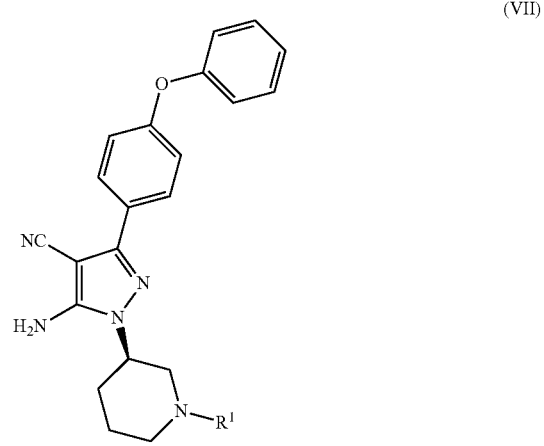

(VII)

or a derivative thereof, wherein $R^1$ is as defined herein (and is, in an embodiment, benzyl), which reaction may be performed under conditions described in international patent application WO 2014/139970; the reaction may be performed for instance by dissolving the compound of formula (I) (e.g. compound of formula (IA)) in a suitable solvent (e.g. ethanol), adding the compound of formula (VI) (e.g. in excess, in solution) and stirring at a low temperature (e.g. at about 5° C.) for a period of time (e.g. 30 mins), then adding base (e.g. triethylamine; in excess) and stirring for a period of time at low temperature (e.g. 1 hour at 5-10° C.) and then for a further period of time (e.g. 14 hours) at a higher temperature (e.g. about room temperature 25° C.)—after work up, the compound of formula (VII) (e.g. in which $R^1$ represents benzyl) may be obtained;

(b) Reaction of a compound of formula (VII), or a derivative thereof, to produce a compound of formula (VIII),

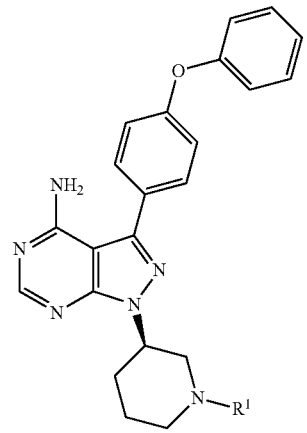

(VIII)

or a derivative thereof, wherein $R^1$ is as hereinbefore defined (e.g. benzyl), and the reaction is performed with reagents and under conditions such as those described in WO 2014/139970; for instance, the compound of formula (VII), or derivative, may be reacted with: (i) formamide (HCONH$_2$); (ii) formamidine or a formamidine salt H—C(=NH)—NH$_3^+$ X$^-$, wherein X$^-$ represents a suitable counterion, such as a halide (e.g. Cl$^-$) or an oxy anion (e.g. acyl-O$^-$), so forming for example formamidine HCl or formamidine acetate or the like; (iii) alkyl (e.g. ethyl) formimidate, or a salt thereof, such as ethyl formimidate HCl; (iv) ethylorthoformate followed by ammonium acetate. Compounds of formula (VIII) in which R$^1$ is a nitrogen protecting group may be converted into compounds of formula (VIII) in which R$^1$ is hydrogen by deprotection, for instance under standard conditions that allow for such removal of R$^1$, e.g. when R$^1$ is benzyl, under hydrogenation reaction conditions, for instance in the presence of a palladium-based catalyst (e.g. Pd(OAc)$_2$) optionally in a suitable solvent (e.g. methanol) and acid/proton source (e.g. 35% HCl), and in the presence of a hydrogen source (e.g. H$_2$ at 10 Psi), and with stirring for an appropriate length of time (e.g. 2 hours at 50° C.), and after appropriate work up, the compound of formula (VIII) in which R$^1$ represents hydrogen may be provided (e.g. separated or isolated);

(c) Reaction of a compound of formula (VIII) in which R$^1$ represents hydrogen (or a derivative of such compound), to provide ibrutinib, for example under conditions described in either WO 2014/139970 or WO 2016/115356; for instance such compound may be reacted with Cl-C(O)—C(H)=CH$_2$ or a two step process may be performed by reaction with 3-chloropropionyl chloride (for instance in the presence of aqueous NaHCO$_3$ in Me-THF), thereby forming a compound of formula (IX),

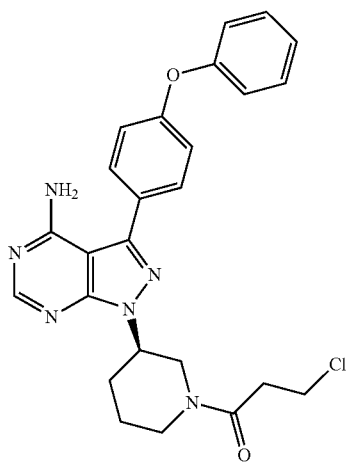

(IX)

or a derivative thereof, wherein such intermediate may undergo an elimination reaction e.g. in the presence of DBU (1,8-diazabicyclo(5.4.0)undec-7-ene) to provide ibrutinib.

For the avoidance of doubt, ibrutinib has the following formula:

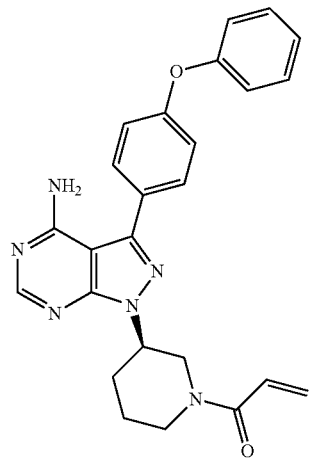

Ibrutinib

In a further embodiment of the invention, the process of the invention described herein (and all its embodiments) may be preceded by one or more process steps to produce the compound of formula (VI) as described herein (or a derivative thereof), for instance the procedures described in WO 2014/139970 may be employed; for instance in accordance with the following scheme:

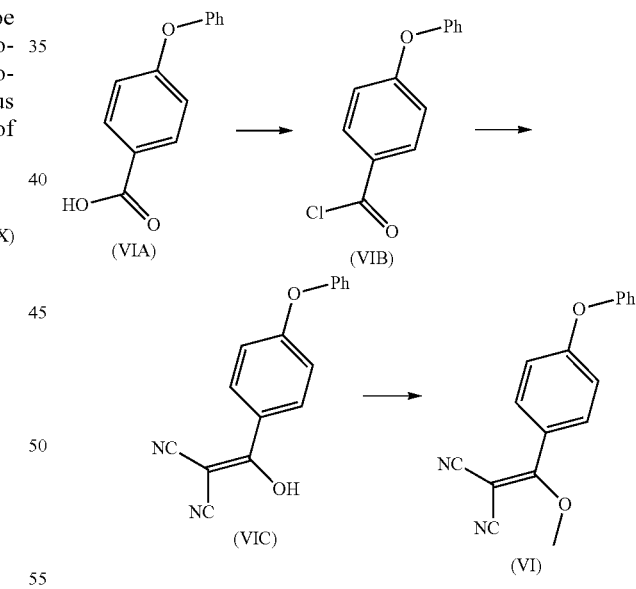

For instance: the conversion from (VIA) to (VIB) may occur in the presence of a suitable reagent (e.g. (COCl)$_2$ in DMF, THF); the conversion from (VIB) to (VIC) may occur by reaction in the presence of malononitrile (e.g. in THF), with the addition (e.g. drop-wise) of a suitable base (e.g. an organic base, such as DIPEA-diisopropylethylamine) for instance at low temperature (e.g. between −60 and −30° C. for about 2 hours, and then subsequent warming to about 20-25° C.); and the conversion of (VIC) to (VI) may occur by the addition of dimethyl-sulfate (e.g. in excess) to the compound of formula (VIC) directly (e.g. in situ) proceeding the formation of (VIC) from (VIB), wherein such reaction may be such that the dimethyl-sulfate is added at about 25° C. or below, and then stirring for e.g. 5 hours at 60-65° C.

The starting materials and certain intermediates may be either commercially available or may be prepared according to conventional reaction procedures generally known in the art.

Where equivalents are referred to, for the avoidance of doubt, this is intended to mean molar equivalents.

In a further aspect of the invention, there is provided a process for separating the product obtained (compound of formula (I)) from the process of the invention (which may be referred to herein as the "compound of the invention"). The compound of the invention (or product obtained by the process of the invention) may thus be separated/isolated. This may be achieved in several ways:
- flash column chromatography
- precipitation/crystallisation
- derivatisation, optionally followed by precipitation/crystallisation
- extraction (e.g. derivatisation followed by extraction)
- distillation In an aspect, the method is derivatisation, for example where the undesired product (e.g. unreacted starting material) is derivatised (e.g. by reaction with succinic anhydride, so forming a group with a terminal carboxylic acid moiety), which may allow for possible separation, extraction or isolation (e.g. the carboxylic acid may be removed in the work-up procedure).

In further embodiments of the invention, there is provided a process of the invention as described herein, following by yet further process steps.

The compound of formula (I) (in enantioenriched form) may be used in the preparation of further compounds, for example further pharmaceutical products (or intermediates thereto) such as pharmaceutical products that are useful in the treatment of cancer (such as hematological malignancies), and particularly the pharmaceutical product may be ibrutinib.

Other conversions (of products obtained by the process of the invention either directly or of further products resulting from downstream steps e.g. as may be described herein) may be performed in accordance with standard techniques and steps in the prior art, for instance, amide-forming reactions (in this instance, possible conditions and coupling reagents will be known to those skilled in the art), esterifications, nucleophilic substitutions reactions and aromatic nucleophilic substitution reactions.

There is then further provided a process for the preparation of a pharmaceutical formulation comprising ibrutinib, which process comprises bringing into association ibrutinib (or a pharmaceutically acceptable salt thereof), which is prepared in accordance with the processes described hereinbefore, with (a) pharmaceutically acceptable excipient(s), adjuvant(s), diluents(s) and/or carrier(s).

In general, the processes described herein, may have the advantage that the compounds prepared may be produced in a manner that utilises fewer reagents and/or solvents, and/or requires fewer reaction steps (e.g. distinct/separate reaction steps) compared to processes disclosed in the prior art.

The process of the invention may also have the advantage that the compound(s) prepared is/are produced in higher yield, in higher purity, in higher selectivity (e.g. higher regioselectivity), in less time, in a more convenient (i.e. easy to handle) form, from more convenient (i.e. easy to handle) precursors, at a lower cost and/or with less usage and/or wastage of materials (including reagents and solvents) compared to the procedures disclosed in the prior art. Furthermore, there may be several environmental benefits of the process of the invention.

EXAMPLES

The following examples are intended to illustrate the present invention and should not be construed as a limitation of the scope of the present invention.

Example 1—Preparation of a Compound of Formula (I)

1a. Reductive Hydrazination

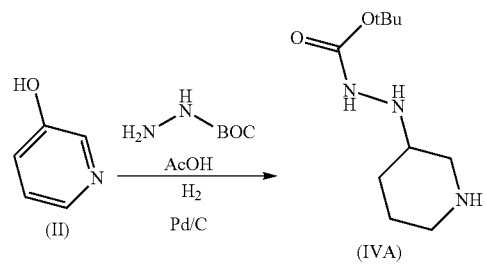

The autoclave was charged with: compound (II) (76 g, 0.799 mol), Boc-N(H)NH$_2$ (106 g, 0.799 mol), acetic acid (48 g, 0.799 mol), 100 ml methanol and 15 g 5% Pd/C. The catalyst contained 56% water that was partially removed by stirring in methanol (75 mL). The solution was then decanted and the remaining catalyst (in a volume of 30 ml methanol) charged to the reactor with an additional 70 ml methanol. So a total of 200 ml methanol was in the reactor. It took 1 hour to heat the autoclave to 62° C. (setpoint: 65° C.).

Hydrogenation occurred at 62° C. and 20 bar overnight.

Work up: After filtration of the catalyst (vacuum, paper) the filtrate was analysed by GC. Full conversion of the pyridine was observed. MeOH was then evaporated by rotavap. About 258 g of a thick oil remained. This oil was poured in 1800 mL cold water (in ice bath), then while stirring by propellor stirrer, 180 g 8 N NaOH was added. The obtained clear solution was extracted by CH$_2$Cl$_2$: 4 times 200 ml, then once 100 ml.

The combined organic layers were dried by sodium sulfate. To prevent crystallization of the product, the mixture was kept warm in a warm water bath, then filtrated to remove sodium sulfate. After a day, some product (compound of formula (IVA), i.e. compound of formula (IV) as hereinbefore defined, but in which R$^2$ represents a BOC protecting group) crystallized out—filtered, not washed and dried.

1b. Benzylation

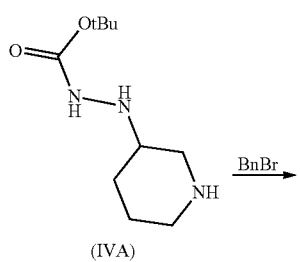

-continued

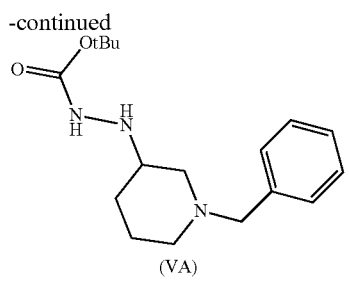

A 250 mL round-bottom flask is charged with 8 g of crystallized material (of compound of formula (IVA in which $R^2$ is a Boc-protecting group) obtained from Exp 1a above. It was dissolved into 100 mL DCM, 5.2 mL $Et_3N$ (2 eq) and BnBr (benzyl bromide) (4.6 mL, 1.05 eq) was added, then stirred for 3.5 hours at R.T.

Work up: The reaction mixture was washed 3 times with 25 ml water. The resulting organic layer was dried and the solvent evaporated. A colourless syrup (5.8 g) remained. To remove other impurities, this syrup was dissolved in 25 ml MTBE+25 ml water. The layers were separated and the water layer extracted once with 25 ml MTBE. The organic layers w e r e combined, dried and MTBE evaporated. The remaining colourless syrup was dried by oil pump, yielding 5.7 g (Yield: 50%).

1c. De-Bocylation

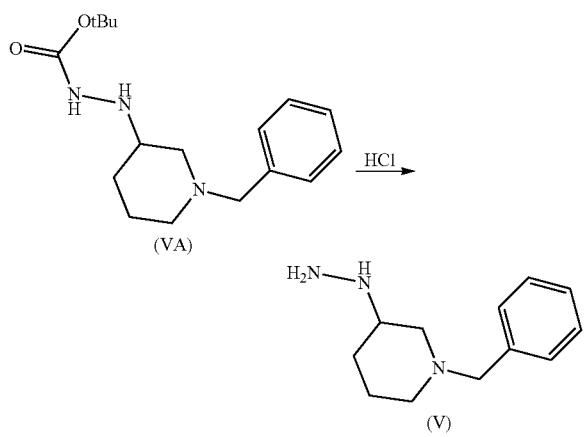

Under $N_2$, 150 ml water was added to a round bottom flask containing over 50 g of purified compound of formula (VA) in which $R^2$ is a Boc-protecting group (as a hard crust on the wall of the flask). The solid material did not dissolve. Over 30 minutes, under nitrogen, 100 ml conc. aq. HCl is dosed/added. The temperature was controlled (max. 24° C.) by use of a water bath. When the HCl addition is completed, a clear solution w a s obtained. The solution was left overnight at 22° C.

Work up: The reaction mixture was cooled in an ice bath and 32 m % NaOH solution (144 g) was added till pH 12 was reached. The yellow solution was transferred under nitrogen to a separation funnel and extracted with 100 ml DCM. The layers separated quickly. The water layer was extracted twice with 100 ml DCM under $N_2$ atmosphere. The combined organic layers were dried with sodium sulfate and DCM evaporated. The remaining light yellow oil was dried by oil pump, yielding 33 g of an oil (Yield=84%). This product (compound of formula (V) in which $R^1$ is benzyl) was stored under nitrogen.

1d. Resolution

A stirred yellow solution of 142 g (692 mmol) of racemic Y10-Bn free base in 1000 mL of MeOH under nitrogen atmosphere was warmed to 50° C. and slowly a warm solution of 58.0 g (386 mmol, 0.56 equiv) of D-(−)-tartaric acid dissolved in 250 mL of McOH was added over 30 minutes. During the last part of the addition the reaction mixture became turbid and started slowly crystallizing. A few seed crystals were added and the reaction mixture was stirred at 50° C. for 1 hour. During this time slow crystallization proceeded. The stirred reaction mixture was then left to cool to room temperature in approximately 4 hours and further stirred overnight. After 20 h the solid was filtered and washed with 120 mL of MeOH. After drying in the vacuum stove: 106.3 g (299 mmol, 43%) of white solid was obtained. $^1$H NMR: 1:1 salt, containing 3 mol % of MeOH; HPLC: e.e. 86.6% (R).

1e. Recrystallisation

In an Erlenmeyer flask with magnetic stirrer was added 176.8 g of (R)—Y10-Bn.D-(−)-TA salt (e. e. 84% (R)). The solid was suspended in 1500 ml MeOH/$H_2O$ 2:1 v/v, and heated to reflux under stirring. At the reflux temperature of 75° C. additional 200 ml of MeOH/H2O 2:1 v/v was added in portions until the slightly yellow solution became clear at reflux (in total: 1700 ml MeOH/$H_2O$ 2:1 v/v). Heating was removed and the solution was left cooling under stirring. At 70° C. seeding crystals (50 mg) were added. The slowly crystallizing suspension was left to cool to room temperature under stirring in 4 hours. After 20 h stirring at room temperature the white solid was filtered off (vacuum filtration on a P2 glass filter), washed with 100 ml MeOH/$H_2O$ 2:1 and 100 ml MeOH, and dried for 30 min on the filter. The solid was transferred to a 500 ml container (148.5 g) and dried in the vacuum stove at 20° C. for 24 hours.

Yield: 142.8 g of white solid (81% crystallization yield); Quantitative NMR with maleic acid: purity 97±2 wt %; HPLC: e.e. ≥99% (R); Optical rotation: [α]20/D −16.7 (c=1, $H_2O$).

Example 2—Preparation of Ibrutinib (Using a Compound of Formula (I) Prepared in Accordance with Example 1

Compound 1 to Compound 6

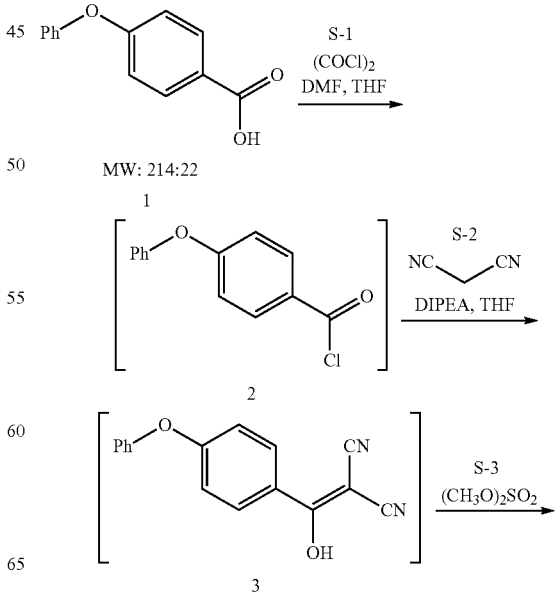

Compound 6 to Compound 7

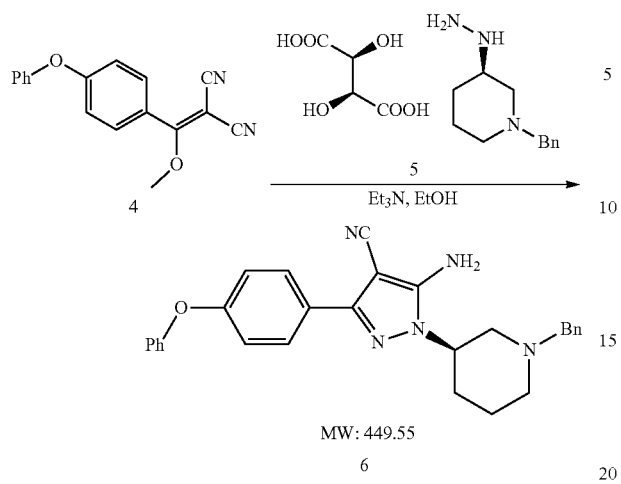

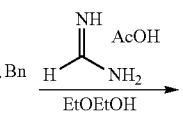

Compound 1 (25.06 g, 117 mmol) was dissolved in dry THF (200 mL, 8V) mixed with DMF (0.33 ml, 0.013V), oxalyl chloride (17.8 g, 0.14 mol, 1.2 eq) was added drop-wise into the THF solution at 20-30° C. under $N_2$ and Compound 2 was obtained after reaction for 1 h. The mixture containing Compound 2 was charged into the malononitrile (8.5 g, 128.7 mmol, 1.1 eq) in THF (25 ml, 1V). Subsequently, DIPEA (37.8 g, 292.5 mmol, 2.5 eq) was added drop-wise into the mixture at −60~−30° C. over 2 h, then warmed to 20~25° C., and Compound 3 was obtained. Subsequently, dimethyl sulfate (44.3 g, 351 mmol, 3.0 eq) was added drop-wise into the mixture below 25° C., then stirred at 60-65° C. for 5 h, to obtain Compound 4. Compound 5 (29 g, 81.5 mmol, 0.7 eq) was dissolved in EtOH (100 mL), and the mixture containing it subsequently charged into Compound 4 solution and stirred at 5° C. for 0.5 h then 29.5 g $Et_3N$ was added drop-wise into the mixture over 1 h at 5-10° C., and then stirred for 14 h at 25° C. to obtain Compound 6. 100 ml EA (ethyl acetate) was charged into the mixture then washed with water (100 ml) twice. The aqueous phase was extracted with EA (200 ml), the organic phases combined, then the EA was exchanged with EtOH (90 ml) and solid came out. The solid was filtered and dried under vacuum at 40° C. for 7 h, 22.47 g Compound 6 was obtained with 99.18a % HPLC purity. The total yield of four steps (S-1 to S-4) was 42.8%. It will be seen that Compound 5 is also referred to herein as a compound of formula (IA) in which $R^1$ is benzyl (which is itself a compound of formula (I)).

Results:
1) From three steps telescope reactions, Compound 4 was generated with 81.64% from IPC. After reacting with total 0.7 eq Compound 5, Compound 6 generated with 75.5%. After workup of this reaction, 22.47 g Compound 6 was isolated with 99.18% HPLC purity.
2) A reaction was carried out to prepare Compound 6 from crude Compound 4 (THF reaction mixture, contain 19.15 g net Y3) with 66.04% HPLC purity. After workup and three times EtOH/$H_2O$ crystallization, 10.28 g Compound 6 was obtained with 98.88% HPLC purity. The mother liquor was recovered by column chromatography and slurried in EtOH, 1.86 g Compound 6 with 99.47% HPLC purity was obtained. So the total isolate yield of four steps is 39.0%.

Compound 6 (10.0 g, 22.2 mmol) and formamidine acetate (23.2 g, 222 mmol, 10 eq.) were dissolved in n-BuOH (150 mL, 15V), the mixture was stirred at 120° C. for 19 h, and then cooled to 20-25° C. EA (150 ml, 10V) was charged into the mixture, then washed with water (125 ml) twice. The aqueous phase was extracted twice with EA (125 ml), the organic layers combined and evaporated to 100 ml, after which solid came out (or crashed out). 150 ml MeOH was charged, then evaporated to 100 ml, after which more solid came out. The mixture was cooled to 10-15° C., the precipitate was filtered and washed with MeOH (20 ml). After vacuum drying at 35° C. for 16 h, 7.16 g Compound 7 was obtained with the HPLC purity of 99.21%. The isolated yield was 67.55%.

Compound 7 to Compound 8

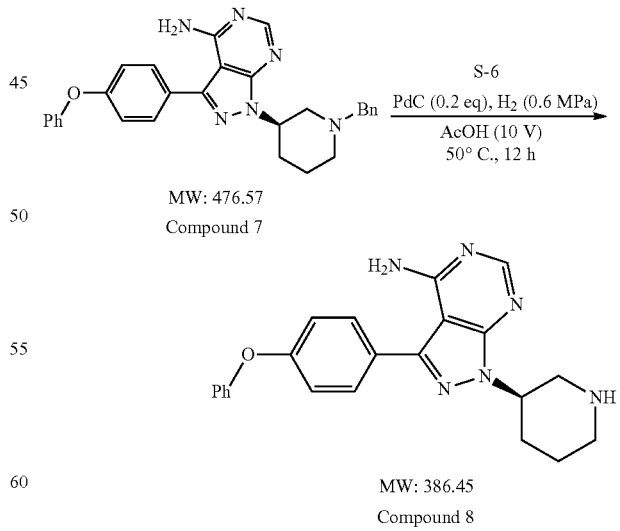

Compound 7 (9.98 g, 20.9 mmol) was dissolved in MeOH (150 mL, 15V), Pd(OAc)$_2$ (1.0 g, 10 Wt %), 35% HCl (2.2 g, 20.9 mmol, 1.0 eq.) were added in turn. The mixture was stirred under hydrogen (20 Psi) for 2 h at 50° C., then filtered and washed with MeOH. Subsequently, 5% KOH (200 ml) was added drop-wise into the mixture, then the precipitate was filtered. After vacuum drying, 5.46 g Compound 8 was obtained with HPLC purity 98.80% in yield of 67.4%.
Compound 8 to Pure PCI-32765 (Ibrutinib)

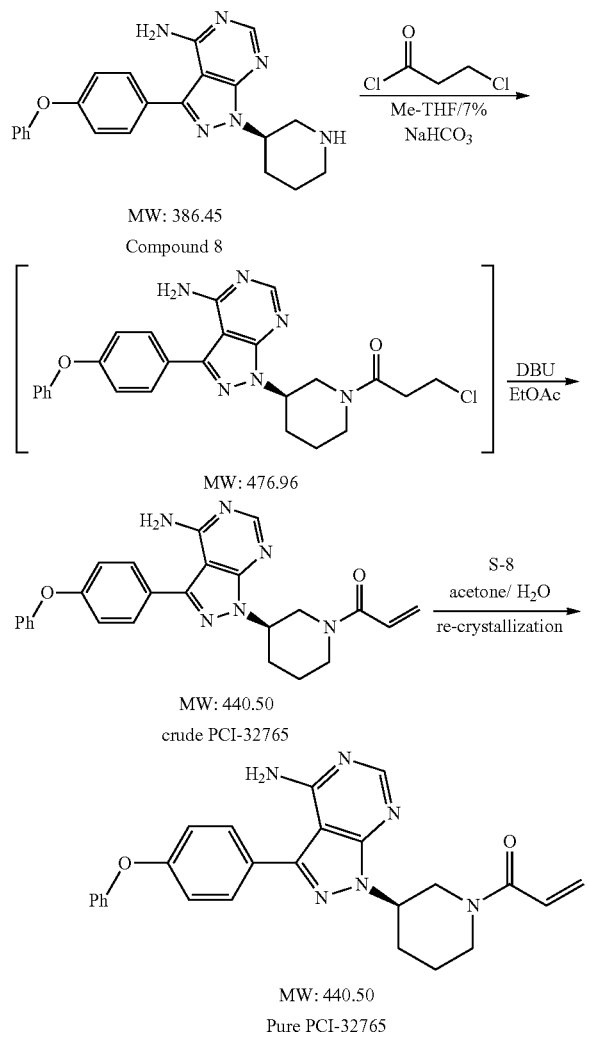

The final step to introduce the substituent on the nitrogen atom of the piperidinyl ring may be performed in accordance with procedures described in international patent application WO 2016/115356, by reaction with 3-chloropropionyl chloride (for instance in the presence of aqueous NaHCO$_3$ in Me-THF), thereby introducing a —C(O)—CH$_2$CH$_2$—Cl group at the nitrogen atom of the piperidinyl. Such intermediate then undergoes an elimination reaction in the presence of DBU (1,8-diazabicyclo(5.4.0)undec-7-ene) to provide ibrutinib.

Example 3

Ibrutinib (or a salt thereof) is prepared by preparing an intermediate using any of the process steps described in Example 1, following by conversion to ibrutinib (or a salt thereof).

Further Example 4

A pharmaceutical composition is prepared by first preparing ibrutinib (or a salt thereof) as per Example 2, and then contacting ibrutinib (or a salt thereof) so obtained with a pharmaceutically acceptable carrier, diluent and/or excipient.

Pharmaceutical Formulation

Ibrutinib may be formulated into a pharmaceutically acceptable formulation using standard procedures.

For example, there is provided a process for preparing a pharmaceutical formulation comprising ibrutinib, or a derivative thereof, which process is characterised in that it includes as a process step a process as hereinbefore defined. The skilled person will know what such pharmaceutical formulations will comprise/consist of (e.g. a mixture of active ingredient (i.e. ibrutinib or derivative thereof) and pharmaceutically acceptable excipient, adjuvant, diluent and/or carrier).

There is further provided a process for the preparation of a pharmaceutical formulation comprising ibrutinib (or a derivative thereof), which process comprises bringing into association ibrutinib, or a pharmaceutically acceptable salt thereof (which may be formed by a process as hereinbefore described), with (a) pharmaceutically acceptable excipient(s), adjuvant(s), diluent(s) and/or carrier(s).

The invention claimed is:

1. A process for preparing a compound of formula (I):

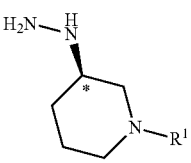

(I)

or a pharmaceutically acceptable salt thereof, in an enantioenriched form, wherein:
R$^1$ is hydrogen or a nitrogen protecting group;
* is a chiral centre of an (R) configuration;
and the process comprises reductive hydrazination of a compound of formula (II):

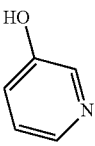

(II)

or a salt thereof, with a compound of formula (III):

H$_2$N—N(H)—R$^2$    (III)

or a salt thereof, wherein R$^2$ is hydrogen or a nitrogen protecting group to form a compound of formula (IV):

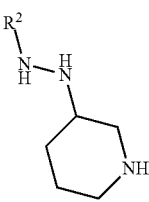

(IV)

or a salt thereof, followed by, in any order at least one of:

optionally deprotecting $R^2$ (when $R^2$ is a nitrogen protecting group), optionally introducing $R^1$ at the NH moiety of the piperidinyl ring (when $R^1$ is a nitrogen protecting group) to form a product, and optionally resolving the product.

2. The process of claim 1, wherein the compound of formula (IV) is converted to a compound of formula (V) (wherein $R^1$ is a nitrogen protecting group) via intermediate compound of formula (VA) (wherein, $R^1$ and $R^2$ are, independently, nitrogen protecting groups):

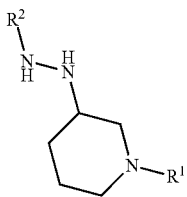

(VA)

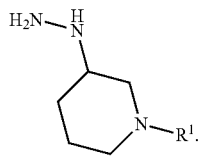

(V)

3. The process of claim 2, further comprising resolving the compound of formula (V) to provide the compound of formula (I).

4. The process of claim 1, wherein the reductive hydrazination is conducted in the presence of a hydrogen source and a suitable catalyst.

5. The process of claim 4, wherein the suitable catalyst is a metal catalyst.

6. The process of claim 5, wherein the metal catalyst is a palladium, nickel or platinum catalyst.

7. The process of claim 5, wherein the metal catalyst is a palladium catalyst.

8. The process of claim 7, wherein the palladium catalyst is palladium on carbon (Pd/C).

9. The process of claim 8, wherein the palladium catalyst is 5-10% Pd/C.

* * * * *